United States Patent

Cuzzato et al.

[11] Patent Number: 5,817,895
[45] Date of Patent: Oct. 6, 1998

[54] PROCESS FOR THE REGENERATION OF A CATALYST BASED ON TRIVALENT CHROMIUM COMPOUNDS

[75] Inventors: Paolo Cuzzato, Treviso; Francesco Rinaldi, Padua; Letanzio Bragante, Albignasego, all of Italy

[73] Assignee: Ausimont, S.p.A., Milan, Italy

[21] Appl. No.: 850,771

[22] Filed: May 2, 1997

[30] Foreign Application Priority Data

May 6, 1996 [IT] Italy .................................. MI96A0891

[51] Int. Cl.⁶ .............................. C07C 17/00; B01J 70/34
[52] U.S. Cl. .................................. 570/169; 502/38; 502/56
[58] Field of Search .................................. 502/29, 31, 38, 502/56; 570/169

[56] References Cited

U.S. PATENT DOCUMENTS 5,262,574  11/1993  Carmello et al. ........................ 570/166

FOREIGN PATENT DOCUMENTS

A0482276  4/1992  European Pat. Off. .

*Primary Examiner*—Michael Lewis
*Assistant Examiner*—Alexander G. Ghyka
*Attorney, Agent, or Firm*—Nikaido, Marmelstein Murray & Oram

[57] ABSTRACT

Process for the regeneration of a fluorination catalyst based on Cr(III) compounds optionally supported, which comprise a) treatment at 350°–40° C. with an air/inert gas mixture and b) treatment at 300°–380° C. with a mixture of an inert gas containing from 0.5 to 5% by volume of an aliphatic hydrocarbon $C_1$–$C_8$.

8 Claims, No Drawings

5,817,895

PROCESS FOR THE REGENERATION OF A CATALYST BASED ON TRIVALENT CHROMIUM COMPOUNDS

The present invention relates to a process for the regeneration of fluorination catalyst based on Cr(III) compounds optionally supported.

The use of catalysts based on Cr(III) in various reactions of halogen-containing organic compounds at high temperatures is well known in the art.

In particular various fluorination catalysts of industrial interest are known, based on Cr(III) oxides/oxyfluorides optionally supported on alumina, fluorinated alumina, aluminium trifluoride, in the reactions in gaseous phase, at high temperatures, between HF and halogen-containing hydrocarbons in order to introduce fluorine atoms.

From U.S. Pat. No. 5,262,574 and from EP 408,005 it is known the use of $Cr_2O_3$ supported on $AlF_3$ in the fluorination in gaseous phase with HF respectively of $CCl_2=CCl_2$ to obtain $CF_3CHCl_2$ (HCFC-123) and of $CHCl=CCl_{12}$ and $CF_3CH_2Cl$ (HCFC-133a) to obtain $CF_3CH_2F$ (HFC-134a).

Such catalysts during their use in an industrial fluorination plant are subjected to deactivation due to the deposit on their surface of organic contaminants comprising carbonaceous residues and/or organic oligomers deriving from cracking and/or oligomerization of the organic compounds put to react.

To re-establish the catalytic activity one generally proceeds to a treatment of the exhausted catalyst with oxidizing gas such as air or oxygen/nitrogen mixtures at sufficiently high temperatures (300°–500°C.) to cause the combustion of the organic contaminants.

However with the above mentioned treatment also the partial oxidation of Cr(III) to Cr(VI) is caused with consequent loss in the active metal Cr(III), wherefore the catalyst results less active and of abbreviated life.

Moreover the formation of toxic and volatile Cr(VI) compounds results highly undesirable since their dispersion in the environment is regulated by the laws in force which do not allow concentrations in Cr(VI) higher than 1 ppm in the sewage waters and even lower concentrations in the gaseous effluents.

In the case of use of the so reactivated catalyst in fluorination processes with HF, the Cr(VI) presence results even more undesirable since it reacts with HF by forming oxyfluoride of Cr(VI), $CrO_2F_2$, gaseous at room temperature and toxic, which pollutes the process effluents.

In order to obviate the loss of chrome of the catalyst during the regeneration with air and in the successive reaction with HF it has been proposed in EP 475,693 to regenerate the catalyst based on chrome compounds by a treatment with a HF/air mixture containing up to 30% by moles of air, at temperatures of 300°–500° C.

However such a process shows the drawback that to avoid the loss of the remarkable amounts of HF utilized in the regeneration mixture, it is necessary to employ two reactors in which, alternatively, in a reactor the regeneration of the exhausted catalyst occurs and contemporaneously in the other reactor the fluorination of the halogen-containing organic compound occurs by recycle of the heated HF directly coming from the reactor user regeneration.

It has now been found a process for the regeneration of exhausted or deactivated catalysts based on Cr(III) compounds which can be carried out in the same reactor containing the catalystic bed, which does not show the inconveniences and the drawbacks that the art reports and allows to obtain a regenerated highly active catalyst, which does not contain Cr(VI) compounds and which has not suffered losses of active Cr(III).

The process according to the invention comprises
 a) a first phase of treatment with an oxidizing gas, in particular air, carried out with modalities known in the art and
 b) a successive phase of treatment with gaseous aliphatic hydrocarbons mixed in particular ratios with an inert gas and at particular temperatures, to reduce the Cr(VI) compounds, formed during the previous oxidation phase, to Cr(III) compounds.

With the use in phase b) of gaseous aliphatic hydrocarbons one could expect that their contact with a so active catalytic surface as that of the catalysts based on Cr(III), in particular of $Cr_2O_3$ and/or Cr(III) oxyfluoride, and the high temperatures employed led to various reactions of cracking or oligomerization of the hydrocarbon molecule, with formation of carbonaceous and/or pitch compounds, which by soiling the surface of the catalyst lower the activity thereof.

The Applicant has instead unexpectedly found that by the use in phase b) of aliphatic hyudrocarbons, mixed in particular ratios with an inert gas and of particular temperatures, no carbonaceous deposits form on the surface of the catalyst but instead the reduction of Cr(VI) compounds to active Cr(III) compounds is obtained.

An object of the present invention is therefore a process for the regeneration of a fluorination catalyst based on Cr(III) compounds optionally supported, exhausted for the presence on its surface of organic contaminants, which comprises:
 a) treatment of the exhausted catalyst with an air flow or an oxygen/inert gas mixture, at temperatures from 350° to 400° C., until the organic contaminants disappear, and
 b) treatment of the catalyst obtained after phase a) with a flow of a gaseous mixture consisting of an inert gas and of 0.5 to 5% by volume of one or more aliphatic hydrocarbons having from 1 to 8 carbon atoms, at temperatures from 300° C. to 380° C., until complete reduction of the Cr(VI) compounds formed during the oxidation phase a), to Cr(III) compounds.

The inert gas employed in phases a) and b) is preferably nitrogen.

The aliphatic hydrocarbons employed in phase b) preferably contain from 1 to 4 carbon atoms such as methane, ethane, propane and butane, butane or propane and their mixtures are preferred and their amount in admixture with the inert gas preferably ranges from 1 to 3% by volume.

The treatment temperature in phase b) preferably ranges from 310° to 340° C., while the pressure is not critical, as it can range from the atmospheric one to about 5 relative bar.

The time of the treatment in phase b) is generally lower than 1 hour.

The process according to the invention is particularly suitable for the regeneration of a fluorination catalyst based on oxide and/or oxyfluoride of Cr(III) supported on $AlF_3$, $Al_2O_3$ or fluorinated $Al_2O_3$, which has been utilized in the fluorination in gaseous phase with HF of halogen-containing hydrocarbons.

In particular, a catalyst based on oxide and/or oxyfluoride of Cr(III) supported on $AlF_3$ can be continuously utilized for long periods of time in an industrial plant for preparing HCFC-123 from perchloroethylene and HF as described in U.S. Pat. No. 5,262,574, by alternating production periods with regenerations cycles according to the process of the invention, without undergoing substantial losses of chrome and of catalytic activity.

On the contrary, if regeneration is carried out by employing only the oxidation phase a), already after few production/regeneration cycles, substantial losses of chrome from the catalyst and a decay of its catalytic activity are noticed.

Some examples follow for illustrative purposes of the invention.

On the catalysts utilized in the examples were determined:

the content of carbonaceous substances by TPO analysis (temperature Programmed Oxidation)

The content of Cr(VI) compounds by TPR analysis (Temperture Programmed Reduction) and oxidimetric analysis by wet way the catalytic activity by catalytic test.

Both TPO and TPR analyses, well known in the art, were carried out by letting flow, respectively an oxidizing gas and a reducing gas, on a catalyst sample while it is heated progressively from the room tempeature to 700° C. at a programmed rate of 10° C./min and determining the variation of the composition of the analysis gas in comparison with a reference gas flow which does not pass on the sample.

For TPO a 40 cc/min flow of an oxygen/helium mixture containing 5% by volume of oxygen was utilized.

For TPR a 40 cc/min flow of an hydrogen/argon mixture containing 10% by volume of hydrogen was utilized.

In the oxidimetric analysis by wet way, well known in the art, the Cr(VI) compounds were extracted from a catalyst sample by washing with acidified water and, successively, titrated with KI/thiosulphate.

The catalytic test comprises the use of a catalyst sample in the standard fluorination of HCFC-133a ($CF_3CH_2Cl$) with anhydrous HF in a molar ratio 133a/HF of 1:4, at a temperature of 320° C.

EXAMPLE 1

A catalyst based on Cr(III) oxide supported on $AlF_3$, prepared as described in U.S. Pat. No. 5,262,574 containing 7.4% of chrome, was utilized in the continuous synthesis of HCFC-123 from perchloroethylene and HF according to the operating condioitions described in example 1 of the above mentioned U.S. patent.

The catalyst, after having continuosuly run until its catalytic activity, evaluated by catalytic test, has fallen to 70% of its initial value, is regenerated in situ by the following treatments in sequence:

a) treatment with a flow of a nitrogen/air mixture containing 30%. by volume of air, at a temperature of 380° C. until disappearance of the organic contaminants, as by TPO analysis, and restoration of the catalytic activity.

The TPR and oxidimetric analysis by wet way show that the catalyst contains 0.2%. by weight of Cr(VI), b) successive treatment with a gaseous nitrogen/propane mixture containing 1% by volume of propane, with a flow rate of 150 Nl/hour per kg of catalyst and at a temperature of 325° C. for 50 minutes, At the TPR analysis the catalyst does not show the presence of Cr(VI).

The TPO analysis does not show the presence of detectable amounts of organic contaminants and the catalytic test shows that the catalyst has the same activity as the initial fresh catalyst.

The so regenerated catalyst is then brought again into operation in the synthesis of HCFC-123 where it acts in the same way as the initial fresh catalyst.

EXAMPLE 2 (comparative)

Example 1 was repeated except that phase b) was carried out with a gaseous nitrogen/propane mixture containing 10% by volume of propane and for 25 minutes. At the TPR and oxidimetric analysis by wet way the catalyst does not show the presence of Cr(VI), but at the TPO analysis it shows the presence of 0.3% by weight (expressed as carbon) of organic contaminants.

The catalyst brought again into operation in the synthesis of HCFC-123, as made in Example 1, becomes deactivated after a time equal to the half of that of the regenerated catalyst of Example 1.

We claim:

1. Process for the regeneration of a fluorination catalyst based on Cr(III) compounds optionally supported, exhausted for the presence on its surface of organic contaminants, which comprises:

a) treatment of the exhausted catalyst with an air flow or an oxygen/inert gas mixture, at temperatures from 350° to 400° C., until the organic contaminants disappear, and b) treatment of the catalyst obtained after phase a) with a flow of a gaseous mixture consisting of an inert gas and of 0.5 to 5% by volume of one or more aliphatic hydrocarbons having from 1 to 8 carbon atoms, at temperatures from 300° C. to 380° C., until the complete reduction of the Cr(VI) compounds formed during the oxidation phase a), to Cr(III) compounds.

2. Process according to claim 1, wherein the Cr(III) compounds are oxides and/or oxyfluorides and the support is selected from $AlF_3$, $Al_2O_3$ and fluorinated $Al_2O_3$.

3. Process according to claim 1, wherein the catalyst consists of oxide and/or oxyfluoride of Cr(III) supported on $AlF_3$.

4. Process according to claim 1, wherein the aliphatic hydrocarbon contains from 1 to 4 carbon atoms.

5. Process according to claim 1, wherein the aliphatic hydrocarbon is propane and/or butane and its amount in admixture with an inert gas ranges from 1 to 3% by volume.

6. Process according to claim 1 wherein the inert gas employed in phases a) and b) is nitrogen.

7. Process according to claim 1, wherein phase b) is carried out at temperatures from 310° C. to 340° C.

8. Process for the fluorination of halogen-containing hydrocarbons with HF in gaseous phase in the presence of a catalyst based on Cr(III) compounds optionally supported, which has been regenerated according to the process of claim 1.

* * * * *